(12) United States Patent
Kintscher et al.

(10) Patent No.: US 11,867,463 B2
(45) Date of Patent: Jan. 9, 2024

(54) ROLLER FOR A ROLLER HEARTH FURNACE

(71) Applicant: SMS GROUP GMBH, Düsseldorf (DE)

(72) Inventors: Björn Kintscher, Velbert (DE); Karl Hoen, Asbach (DE); Markus Pieper, Mettmann-Unterrath (DE)

(73) Assignee: SMS GROUP GMBH, Dusseldorf (DE)

( * ) Notice: Subject to any disclaimer, the term of this patent is extended or adjusted under 35 U.S.C. 154(b) by 281 days.

(21) Appl. No.: 17/264,550

(22) PCT Filed: Jul. 15, 2019

(86) PCT No.: PCT/EP2019/068992
§ 371 (c)(1),
(2) Date: Jan. 29, 2021

(87) PCT Pub. No.: WO2020/025303
PCT Pub. Date: Feb. 6, 2020

(65) Prior Publication Data
US 2021/0310737 A1    Oct. 7, 2021

(30) Foreign Application Priority Data

Jul. 30, 2018 (DE) .................... 10 2018 212 702.6
Nov. 26, 2018 (DE) .................... 10 2018 220 216.8

(51) Int. Cl.
| | | |
|---|---|---|
| *F27D 3/02* | (2006.01) | |
| *F27B 9/24* | (2006.01) | |
| *C03B 35/18* | (2006.01) | |
| *C03B 40/00* | (2006.01) | |
(Continued)

(52) U.S. Cl.
CPC ............ *F27D 3/026* (2013.01); *F27B 9/2407* (2013.01); *C21D 9/46* (2013.01); *F27B 2009/3066* (2013.01); *F27D 2009/0013* (2013.01)

(58) Field of Classification Search
CPC ............ F27D 2009/0013; F27D 3/026; F27B 2009/3066; F27B 9/2407; C03B 35/181; C03B 35/184; C03B 35/185
See application file for complete search history.

(56) References Cited

U.S. PATENT DOCUMENTS 5,355,996 A * 10/1994 Hart ..................... F27D 3/026
                                                   432/236
5,441,407 A    8/1995 Stamm
8,047,838 B2  11/2011 Chever

FOREIGN PATENT DOCUMENTS

CN    1924031 A       3/2007
DE    4041217 A1 *    7/1991
(Continued)

OTHER PUBLICATIONS

Original and Translation of DE-4041217-A1 to Erfinder (Year: 1991).*

*Primary Examiner* — Steven S Anderson, II
(74) *Attorney, Agent, or Firm* — LUCAS & MERCANTI, LLP; Klaus P. Stoffel

(57) ABSTRACT

A roller for a roller hearth furnace, the roller including a water-cooled, rotatably mounted carrying axle on which a plurality of support rings are arranged at a spacing from one another. In the axial region between and next to the support rings, the carrying axle is provided with insulation composed of a fiber material and configured with protection of the outer circumference of the fiber material from the environment. In the case of insulation constructed from ring-shaped punched parts, the insulation arranged in the
(Continued)

axial region between and next to the support rings is composed of circular or ring-shaped punched fiber parts. The protection is configured as ring-shaped insulating disks composed of a more resistant material than that of the punched fiber parts, and at least one punched fiber part is provided in each case between two insulating disks.

3 Claims, 1 Drawing Sheet

(51) Int. Cl.
*C21D 9/46* (2006.01)
*F27B 9/30* (2006.01)
*F27D 9/00* (2006.01)

(56) References Cited

FOREIGN PATENT DOCUMENTS

| DE | 4041217 A1 | 7/1991 |
|----|------------|--------|
| DE | 4141250 A1 | 6/1993 |
| DE | 19504044 A1 | 9/1995 |
| DE | 19923114 A1 | 11/2000 |
| JP | 01201417 A | 8/1989 |
| JP | 02107716 A | 4/1990 |
| JP | 02145718 A | 6/1990 |
| JP | 4259322 B2 | 9/1992 |
| WO | 199421978 A1 | 9/1994 |
| WO | 2005113843 A1 | 12/2005 |
| WO | 2006106203 A1 | 10/2006 |
| WO | 2018059940 A | 4/2018 |

* cited by examiner

ROLLER FOR A ROLLER HEARTH FURNACE

CROSS-REFERENCE TO RELATED APPLICATIONS

The present application is a 371 of International application PCT/EP2019/068992, filed Jul. 15, 2019, which claims priority of DE 10 2018 212 702.6, filed Jul. 30, 2018, and DE 10 2018 220 216.8, filed Nov. 26, 2018, the priority of these applications is hereby claimed and these applications are incorporated herein by reference.

BACKGROUND OF THE INVENTION

The invention relates to a roller for a roller hearth furnace, said roller comprising a water-cooled, rotatably mounted carrying axle on which a plurality of support rings are arranged at a spacing from one another, wherein, in the axial region between and next to the support rings, the carrying axle is provided with insulation which is composed of a fiber material and which is configured with a means which protects the outer circumference of its fiber material from the environment.

Such rollers of a roller hearth furnace with support rings which transport a material to be heat-treated, for example a slab or a metal sheet, have a water cooling system in order to protect the rollers against excessively high temperatures and premature failure associated therewith. The accompanying extraction of heat of the furnace or high energy consumption in the furnace, respectively, is reduced in the case of known rollers by way of thermal insulation of the carrying axle, said insulation being provided between and next to the support rings and being composed of a fiber material.

The thermal insulation furthermore ensures that, on the one hand, the material to be heat-treated is not cooled to an impermissible extent and, on the other hand, the carrying axle is not heated to an impermissible extent.

The rollers with thermal insulation composed of a for example refractory fiber material or of a fiber wool have a substantially lower weight than rollers known in the prior art with thermal insulation composed of concrete.

To this end, WO 2018/059940 A1 has disclosed the arrangement of insulation between at least two support rings, preferably between all of said support rings, the insulation preferably being composed completely of fiber material. The fiber material used is advantageously aluminum oxide and/or silicon oxide.

It proves to be disadvantageous here that the insulating fiber material is attacked by flying scale or scale particles and is gradually removed or destroyed. In association therewith, the insulating action decreases and the rollers with the support rings have to be exchanged with a high maintenance effort.

The service life of the fiber-insulated roller is therefore greatly reduced compared to a concrete-insulated roller.

DE 40 41 217 A1 has disclosed a continuous furnace whose driven rollers are composed of fluid-cooled core tubes and support/thermal insulation arrangements provided on the core tubes, the intention here being to reduce the effort involved in maintaining the rollers. To this end, provision is made for the insulation of the cooled core tube to be composed of a support/thermal insulation arrangement which can be pushed in an axial direction over the core tube and which is arranged on a cover tube which can be pushed onto the core tube. The cover tube is configured with support disks or rings.

Document DE 199 23 114 A1 relates to a roller for a heat treatment furnace, having a roller core on which at least two support rings are arranged, thermal insulation arranged therebetween and a respective outer insulating tube which surrounds the thermal insulation. The insulation in DE 199 23 114 A1 is composed of identical insulating rings which are arranged next to one another and is sheathed with a heat-resistant stainless steel cylinder.

Document WO 2006/106203 A1 likewise discloses a roller for a heat treatment furnace, having a roller core on which spaced-apart support rings are arranged. One-piece thermal insulation, which can be manufactured from concrete, is arranged between the support rings.

Document DE 195 04 044 A1 discloses a heat-resistant transport roller for continuous furnaces, having a shaft which is cooled from the inside and on the lateral surface of which there are arranged a multiplicity of cylindrical disks composed of fiber ceramic, said disks being compressed in an axial direction by means of a pressure-generating device. Said cylindrical disks are used as support rings for the material to be transported and are not spaced apart.

It is also known in the prior art that, next to the support rings and in the intermediate region of the support rings, the carrying axle is filled with ring-shaped punched fiber parts which can be pushed onto the carrying axle. Here, too, the disadvantages described above arise as with the insulating fiber material.

SUMMARY OF THE INVENTION

The invention is therefore based on the object of improving the construction of the insulation such that the negative effect of scale or scale particles on the fiber material is significantly reduced and thus the service life of the fiber-insulated roller is increased.

Said object is achieved according to the invention in that, in the case of insulation constructed from ring-shaped punched parts, the insulation arranged in the axial region between and next to the support rings is composed of circular or ring-shaped punched fiber parts, wherein the protective means is configured in the form of ring-shaped insulating disks composed of a more resistant material than that of the punched fiber parts, and at least one punched fiber part is provided in each case between two insulating disks.

The scale which adheres to the material to be heat-treated, which comes loose during transport by means of the rollers through the roller hearth furnace and which flies around in the environment of the rollers can thus no longer remove or destroy the insulating fiber material of the roller; rather, the surface of the insulation is protected by the means which is resistant to the impact of scale.

Here, the protective means can be configured as a sheathing of the insulation. The insulating fiber material arranged on the carrying axle of the rollers is enclosed, preferably seamlessly over its entire circumference, by the sheathing, wherein the thin sheathing, in relation to its height, lies below the transport plane of the rollers, that is to say the support rings thereof.

A further configuration provides that the sheathing is composed of a more resistant fiber material than that of the insulation. The sheathing used here can be a fiber material which is reinforced by ceramic fibers in the form of an oxide-ceramic fiber composite (OCMC) or by a material of similar hardness.

Provision is also made for the sheathing to be composed of metal or concrete. The hot scale or the scale particles cannot damage or penetrate either the metal or the concrete but rather ricochet off the latter.

According to one embodiment of the invention, it is proposed that, in the case of insulation constructed from ring-shaped punched parts, the insulation arranged in the axial region between and next to the support rings is composed of circular or ring-shaped punched fiber parts, wherein the protective means is configured in the form of ring-shaped insulating disks composed of a more resistant material than that of the punched fiber parts, and at least one punched fiber part is provided in each case between two insulating disks.

The insulating disks, which can be composed of a reinforced ceramic fiber material, preferably an oxide-ceramic fiber composite (OCMC), protect the punched fiber parts inasmuch as the impingement and ricocheting off of the flying scale occur not only on the outer circumference of the punched fiber parts but also on the outer circumference of the more resistant insulating disks. The alternating arrangement of a circular or ring-shaped punched fiber part and of an insulating disk makes it possible to achieve a situation whereby the softer punched fiber parts are largely preserved and the more resistant insulating disks ensure thermal insulation of the carrying axle in an unimpaired manner.

Both as a result of the sheathing of the insulating fiber material and as a result of the arrangement of the insulating disks next to the punched fiber parts, it is advantageously achieved that the service life of the thermal insulation, and in association therewith the service life of the water-cooled roller, is increased, whereby the energy saving of the roller hearth furnace is simultaneously ensured over a relatively long period of time.

BRIEF DESCRIPTION OF THE DRAWING

Further features and details of the invention emerge from the patent claims and the following description of exemplary embodiments of the invention which are illustrated in the drawings, in which:

DETAILED DESCRIPTION OF THE INVENTION

Figure 1:
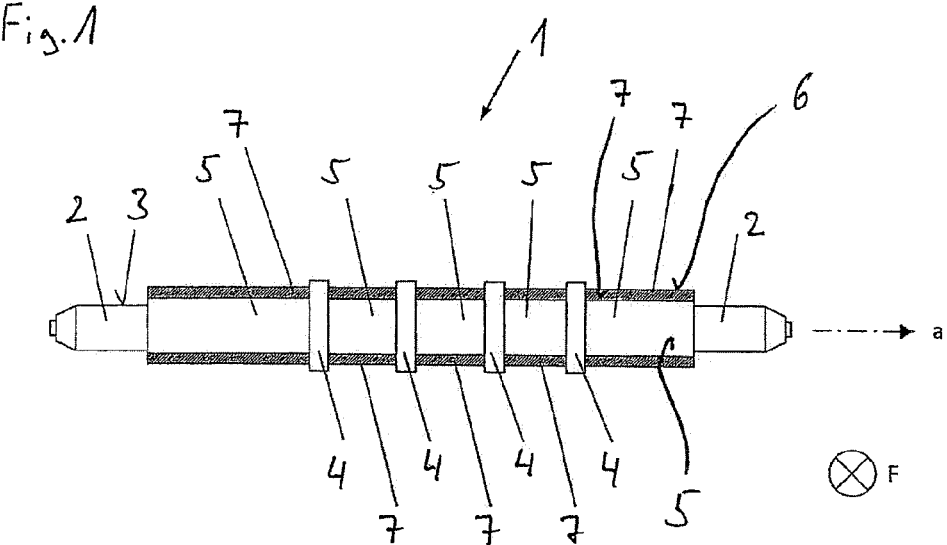
FIG. 1 shows, as a detail of a roller hearth furnace, a schematic illustration of a water-cooled roller which is configured with a plurality of support rings in an axial direction and in the case of which insulation composed of fiber material is provided both between and next to the support rings.

FIG. 1 schematically illustrates the construction of a water-cooled roller 1. The roller 1 has an axis a about which said roller can rotate. A conveying direction F is horizontal on the plane of the drawing in FIG. 1; a material to be heat-treated, for example a slab or a metal sheet, is transported in the conveying direction F, said material to be heat-treated passing through a roller hearth furnace in which a plurality of such rollers 1 are installed successively at a spacing in the conveying direction F.

The roller 1 comprises a cylindrical carrying axle 2 and a cylindrical outer circumference 3. Here, the carrying axle 2 can be composed both of a solid bar material which is preferably forged or rolled and of a tube which is preferably produced by way of centrifugal casting.

A plurality of support rings 4 are arranged at an axial spacing on the carrying axle 2. The support rings 4 establish the contact with the material to be heat-treated which is to be transported.

In the axial region between two support rings 4, and also next to the respectively outer support rings 4, the carrying axle 2 is configured with insulation 5.

The insulating material used is a refractory fiber material, preferably composed of aluminum oxide and/or of silicon oxide, or a special refractory wool, likewise composed of aluminum oxide and/or silicon oxide.

In order to protect the insulation 5 composed of the fiber material or of the refractory wool against scale or scale particles flying around in the vicinity of the roller 1, the insulation 5 is configured with a means 6 which protects the outer circumference of its fiber material or of its refractory wool, wherein the protective means 6 is configured as a sheathing 7 of the insulation 5.

The protective sheathing 7 is preferably composed of a more resistant fiber material than the insulation 5, and is optionally composed of metal or concrete.

Figure 2:
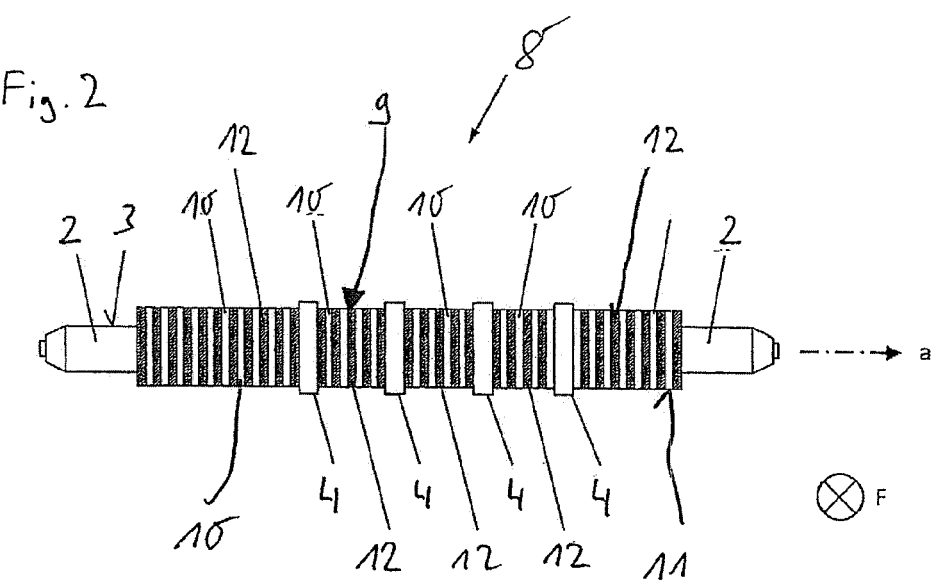
FIG. 2 shows, as a detail of a roller hearth furnace, a schematic illustration of a water-cooled roller which is configured with a plurality of support rings in the axial direction and in the case of which circular or ring-shaped punched fiber parts and insulating disks are provided both between and next to the support rings.

FIG. 2 is schematically one embodiment according to the invention of a water-cooled roller corresponds to the roller 1 described in the introduction.

In contrast to the roller 1, in the case of the roller 8, insulation 9, which is composed of circular or ring-shaped punched fiber parts 10, is arranged on the carrying axle 2 in the axial region between two support rings 4 and also next to the respectively outer support rings 4,
wherein a protective means 11 is configured in the form of ring-shaped insulating disks 12, and a punched fiber part 10 is provided in each case between two insulating disks 12.

The punched fiber parts 10 are likewise composed of a refractory fiber material, preferably of aluminum oxide and/or of silicon oxide.

In contrast, the insulating disks 12 are manufactured from a more resistant material than that of the punched fiber parts 10. Here, use is preferably made of insulating disks 12 composed of ceramic fiber material, for example an oxide-ceramic fiber composite (OCMC).

The alternating arrangement of a punched fiber part 10 and of an insulating disk 12 achieves a situation whereby the impingement and ricocheting off of the flying scale particles occur not only on the outer circumference of the punched fiber parts 10 but also on the outer circumference of the more resistant insulating disks 12. In order to further support this effect,
the insulating disks 12 can have a greater width than the punched fiber parts 10.

LIST OF REFERENCE DESIGNATIONS

1 Roller
2 Carrying axle
3 Outer circumference
4 Support ring
5 Insulation
6 Protective means
7 Sheathing
8 Roller
9 Insulation

10 Circular or ring-shaped punched fiber part
11 Protective means
12 Insulating disk
a Axis
F Conveying direction

The invention claimed is:

1. A roller for a roller hearth furnace, comprising: a water-cooled, rotatably mounted carrying axle; a plurality of support rings arranged on the carrying axle at a spacing from one another; insulation provided on the carrying axle in axial regions between and next to the support rings, the insulation being composed of a fiber material; and protective means for protecting an outer circumference of the fiber material from the environment, wherein the insulation is composed of circular or ring-shaped punched fiber parts, wherein the protective means is configured as ring-shaped insulating disks composed of a more resistant material than the material of the punched fiber parts, wherein at least one of the punched fiber parts is provided in each case axially between two of the insulating disks.

2. The roller according to claim 1, wherein the insulating disks are composed of a more resistant fiber material than the material of the punched fiber parts.

3. The roller according to claim 1, wherein the insulating disks have a greater width than the punched fiber parts.

* * * * *